Patented May 9, 1950

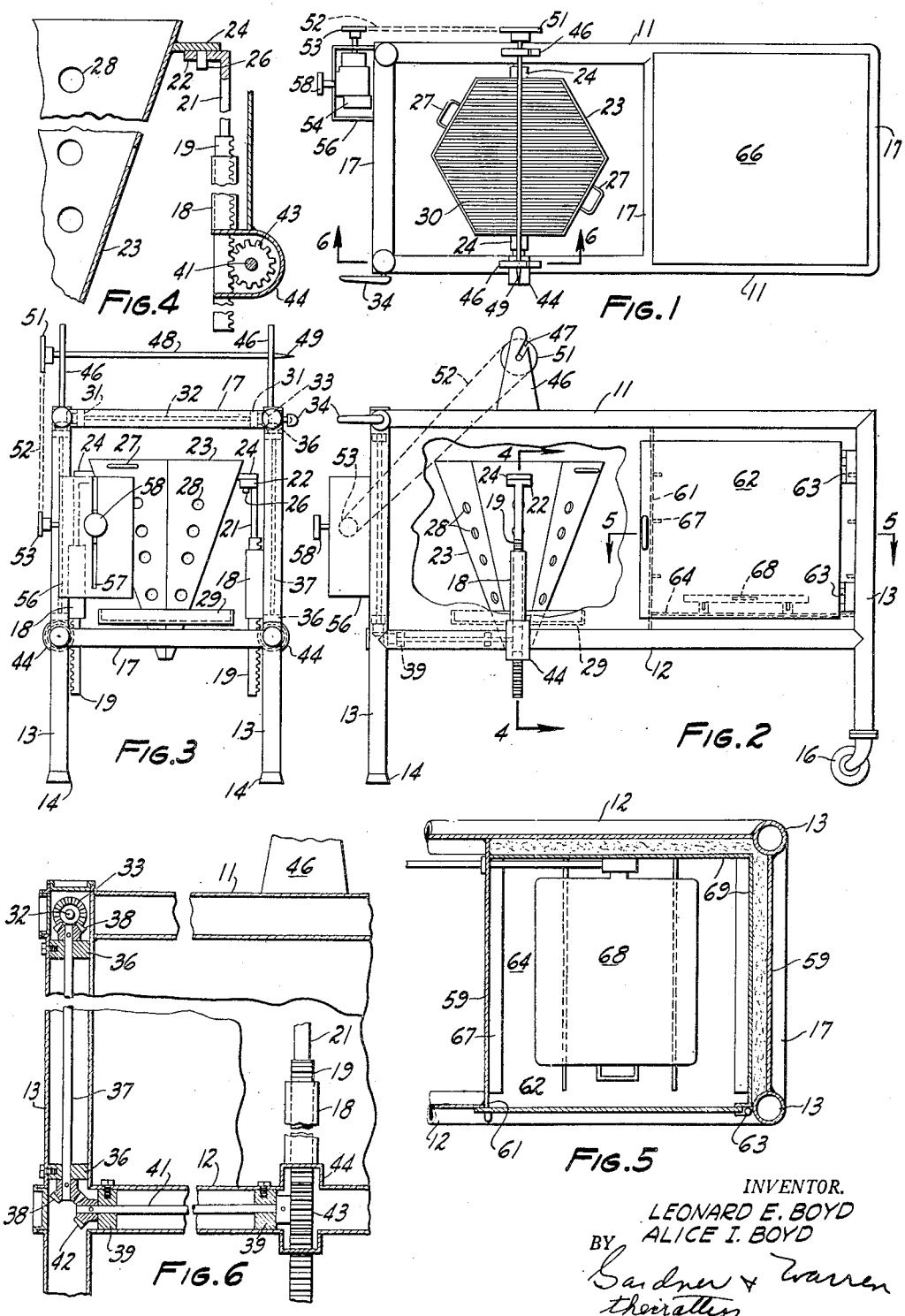

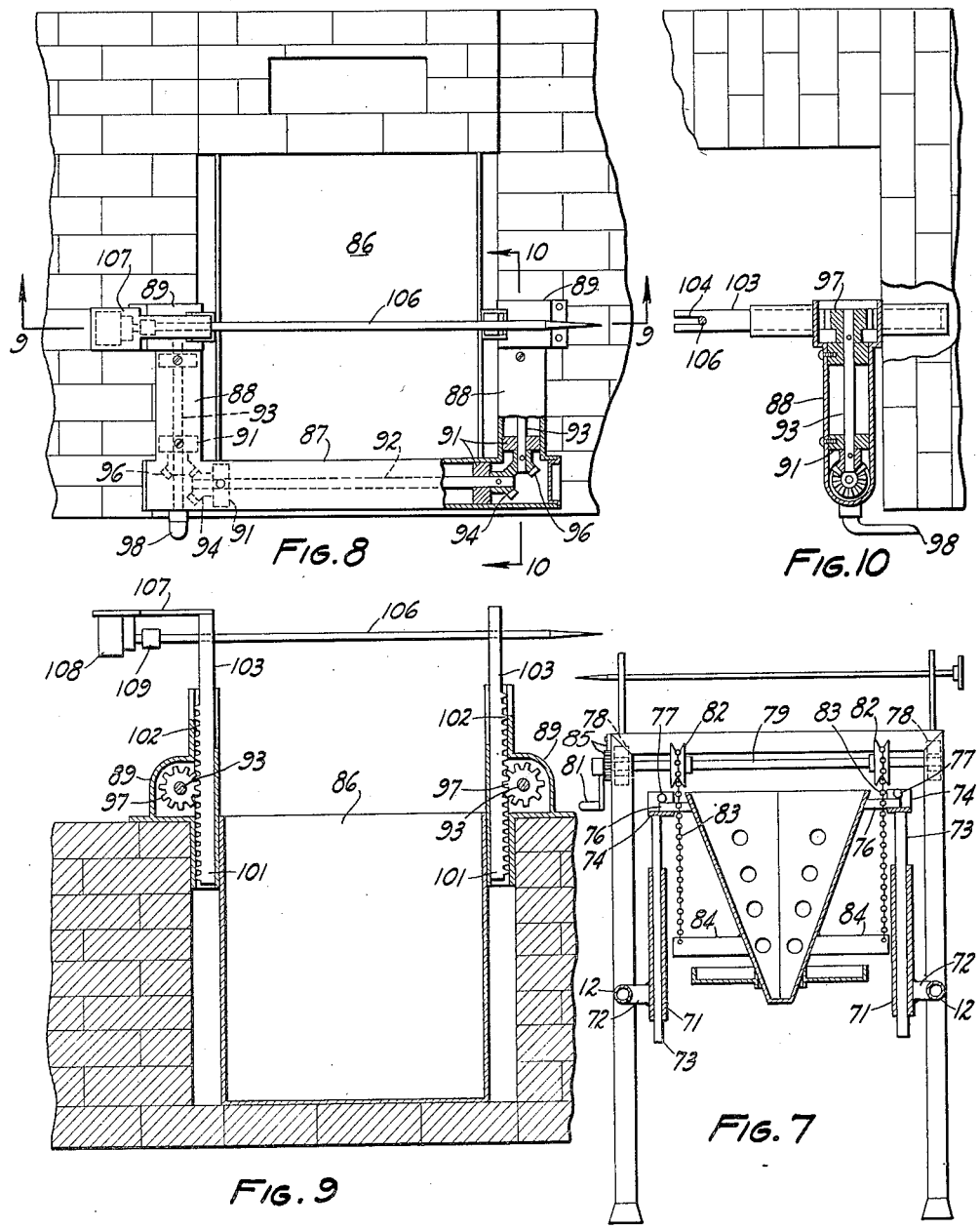

2,507,243

UNITED STATES PATENT OFFICE 2,507,243

BARBECUE APPARATUS

Leonard E. Boyd and Alice I. Boyd, Oakland, Calif.

Application January 9, 1946, Serial No. 639,977

3 Claims. (Cl. 126—25)

This invention relates to apparatus for supporting food to be cooked in proximity to an open fire or a bed of glowing coals.

An object of the invention is to provide, in apparatus of the character described, means for variably regulating the spacing between the food holding device or spit and the fire so as to control, as desired, the intensity of the heat applied to the food.

Another object of the invention is to provide, in barbecue apparatus having mechanism for raising or lowering a firepot relative to the food supporting element, means for enclosing the mechanism so as to protect it from possible damaging exposure to direct heat and ashes issuing from the firepot.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 1 is a top plan view of a portable barbecue apparatus embodying our invention.

Figure 2 is a side elevational view of the structure of Figure 1, portions of the view being broken away so as to more clearly disclose the interior construction.

Figure 3 is an end elevational view of the apparatus.

Figure 4 is an enlarged vertical sectional view of a portion of the apparatus. The plane in which the view is taken is indicated by the line 4—4 of Figure 2.

Figure 5 is an enlarged horizontal sectional view of the oven portion of the apparatus. The plane in which the view is taken is indicated by the line 5—5 of Figure 2.

Figure 6 is an enlarged vertical sectional view of a portion of the apparatus, the view being taken in the plane indicated by the line 6—6 of Figure 1.

Figure 7 is an end elevational view, partly in vertical section, showing a modified form of firepot mounting.

Figure 8 is a top plan view of a stationary barbecue installation showing associated therewith the mechanism of our invention for varying the relationship between the spit and the firepot.

Figure 9 is a vertical sectional view taken in the plane indicated by the line 9—9 of Figure 8.

Figure 10 is an end elevational view, partly in vertical section, of the structure shown in Figure 8. The plane in which the sectional portion of the view is taken is indicated by the line 10—10 of Figure 8.

In keeping with the growing trend among many people to spend as much time as possible outdoors, the practice of preparing and taking occasional meals in gardens or other outdoor spaces has become an established custom. This has led to the appearance of numerous stationary or portable devices in the nature of stoves or grills designed especially for outdoor use and on which food may be prepared and cooked in the immediate presence of the diners. Most of these devices comprise a receptacle or firepot for containing combustible material, usually charcoal, which is positioned below a grid or grill plate upon which the food to be cooked is supported above the firepot. There also may be included a support or rotatable spit upon which portions of food may be impaled and revolved in the path of the heat rising from the firepot so as to uniformly cook the food. In these devices, the relationship of the bed of coals and the grill or spit supporting the food thereable is fixed and very careful watching on the part of the attendant is necessary in order to prevent overcooking or actual burning of the food. On the other hand, the coal bed may be substantially consumed which means that the radiated heat will be greatly reduced and consequently an extended time will be required to properly cook the food.

We have provided an improved barbecue apparatus embodying many features desirable to the average user and which overcomes the objectionable features set forth above. In detail, and with particular reference to Figures 1 to 6 inclusive, we provide a portable apparatus comprising a carriage having upper and lower rectangular frames 11 and 12 respectively which are vertically spaced relative to each other and are each connected, at the respective corners to vertically extending legs 13. Both the frames 11 and 12 and the legs 13 are of tubular construction to conserve weight and to facilitate the mounting of mechanism which will be more particularly described later. One pair of legs 13 is provided with rubber or metal ground-engaging feet 14 while the other pair of legs is provided with pivoted caster wheels 16 on which the apparatus may be moved from place to place as desired. Intermediate transverse tubular cross-members 17 are provided in each frame 11 and 12 to lend rigidity thereto and to serve as structural supports as will be described later.

Means are provided for supporting a fuel carrier on the carriage and means are further provided for moving the carrier relative to the carriage. Attached to and extending upwardly from the opposed longitudinal side members of the lower frame 12 is a pair of tubular guides 18 each of which is provided with a slidable rack section 19 having an extended upper support member 21 formed at its extremity with an inturned apertured flange 22. The bores of the guides 18 are each rectangular in cross-sectional form so as to correspond with the similar cross sectional shape of the rack sections and to thus prevent any rotary movement of the latter, about a vertical axis, relative to the guides. A sheet metal firepot 23, of inverted pyramid form, is provided and is fitted with opposed lugs 24 having integral downwardly projecting pins 26 adapted to enter the apertures of the flanges 22. The firepot is thus suspended from the upper ends of the rack sections and handles 27 or their equivalent are provided by means of which the firepot may be removed from the carriage so as to dump the ashes which may accumulate therein. Combustible material such as wood, charcoal or the like may be placed in the firepot and ignited and apertures 28 are provided in the sides of the firepot through which combustion supporting air may flow. A tray 29 attached to and concentric with the bottom portion of the firepot is provided for intercepting any coals or ashes which may drop from the firepot through the breather openings 28. The firepot is further provided with a removable closure screen 30 so as to prevent ash from the firepot being carried upwardly by the current of heated air rising therefrom. Positioned concentrically within a transverse cross-member of the upper frame 11 and journaled in bearings 31 secured therein, is a crank shaft 32 having miter gears 33 secured to and rotatable therewith and an extended end portion projecting exteriorly of the frame to which is secured a manually operable crank 34. Concentric with and journaled in each adjacent leg 13 in bearings 36 provided therein is a vertical shaft 37 carrying at the respective ends thereof miter gears 38 the uppermost one of which meshes with a miter gear 33 so as to operatively connect the shafts 32 and 37 together. A portion of each side member of the lower frame 12 is fitted with internal bearings 39 which journal a shaft 41 provided, at one end, with a miter gear 42 meshing with the lowermost miter gear 38 and, at the other end, with a spur gear 43 positioned within a housing 44 formed on the frame side member and registering with a plane extending transversely of the carriage and coinciding with the vertical axis of the firepot 23 and the rack sections 19. The latter sections extend into the housings 44 and mesh with the teeth of the spur gears 43 therein. It will be seen that if the crank 34 is manipulated to rotate the shaft 32, corresponding rotation of the shafts 37 and 41 will occur, due to their interconnection by the miter gears, and the gears 43 will also be rotated to cause elevation or lowering of the rack sections 19 in the guides 18 and thereby raise or lower the firepot relative to the carriage.

Means is provided for supporting a portion of food, such as a chunk of meat or a fowl, above the firepot and means is further provided to cause rotation of said supported portion so as to progressively present all sides of the latter to the rising column of heat from the firepot in order to insure thorough and uniform cooking of the food. Secured to and rising from the longitudinal side members of the upper frame 11 is a pair of brackets 46, positioned in the vertical plane of and above the firepot, each of which is provided with an angular upwardly opening notch 47 in which a rod-like spit 48 is journaled. One end of the spit 48 is provided with a relatively sharp point 49 to facilitate the impaling of the food portion on the spit and the other end of the pit is provided with a grooved pulley or sprocket 51 which is engaged or meshed with a belt or chain 52 looped downwardly and engaging or meshing with a pulley or sprocket 53 carried and driven by a variable speed electric motor 54. Mounting for the motor 54 is effected by a box-like bracket 56, carried by one of the legs 13 or another convenient portion of the carriage, having an elongated vertical slot 57 associated with a clamp screw 58 threadedly engaged with the motor housing so that the motor may be positioned as desired anywhere along and within the limits of the slot. This provides for slackening of the belt or chain 52 when it is desired to remove the spit 48 from engagement with its support brackets 46 and similarly permits tightening the belt or chain if desired. Although it is not shown, means may be provided in the form of a rheostat familiar to anyone skilled in mechanical arts for varying the speed of the motor 54 so that as slow or fast a speed of rotation of the spit 48 as desired may be obtained. This regulation of spit rotation plus the adjustability of the firepot from and toward the spit will coact to cover all conditions under which the cooking of the food may be carried out.

Means is provided on the carriage serving as a heat compartment or oven in which dishes or previously cooked portions of food may be kept hot until such time as it is desired to serve them. Extending vertically between the side members of the frames 11 and 12, between opposed pairs of legs 13 and between the cross-members 17 are sheet metal walls 59 one of which, on a longitudinal face of the carriage, is provided with an opening 61 closed by means of a door 62 mounted on hinges 63. A plate 64 extending horizontally between the vertical transverse walls 59 forms a bottom closure for the compartment and a similar plate 66 forms the top thereof. The said vertical transverse walls of the compartment are provided, within the latter, with spaced rails 67 for holding support shelves or the like within the compartment and a grill 68 which may be normally stored in the compartment is adapted to be placed across the top frame 11 above the firepot when frying is to be done. Heat insulation of the compartment is accomplished by providing the side, rear and top wall members thereof with spaced parallel plates 69 to form jackets in which may be placed magnesia, asbestos or other such heat insulation material. It will be noted that the transverse side walls of the compartment adjacent the firepot is devoid of insulation so as to provide for ready conductance of heat radiated from the firepot into the heat compartment.

In Figure 7, we have shown a modified form of elevating mechanism for the firepot. In this structure axially vertical tubular slides 71 are mounted by brackets 72 on the longitudinal side members of the frame 12, in which are slidably mounted by brackets 72 on the longitudinal side members of the frame 12, in which are slidably mounted rods 73 having at their upper ends U-shaped clips 74 engaging axially aligned studs 76 projecting from diametrically opposed sides of the firepot. Removable pins 77 or the like may be provided for securing engagement between the clips 74 and the studs 76. Journaled in bearings 78 carried by the side members of the frame 11 is a shaft 79 fitted at its extended end with a crank 81 and carrying grooved drums 82 connected with depending chains 83 attached at their lower ends to arms 84 extending from and attached to the bottom of the firepot. The arrangement of the parts is such that when the crank 81 is manipulated to rotate the shaft 79, the chains 83 will be wound upon the drums 82 and the firepot will be correspondingly lifted. A ratchet wheel and pawl 85 are provided for locking the shaft 79.

In Figures 8 through 10, we have shown mechanism designed for use with stationary barbecue pit installations. In this structure the pit 86 along its front and sides is provided with a cast metal or fabricated steel unit comprising a tubular frontal housing 87 having adjacent its ends integral side housings 88 extending along the sides of the pit and terminating substantially medially thereof in gear housings 89. Secured in spaced relation in each of the housings 87 and 88 are bearings 91 each of which is centrally bored to provide journals for shafts 92 and 93 respectively. The shaft 92 which is concentric with the housing 87 is fitted at the respective ends thereof with miter gears 94 and the shafts 93 similarly mounted in the side housings 88 are fitted at their ends with miter gears 96, meshing with the gears 94, and with spur gears 97 disposed in the gear housings 89. One of the shafts 93 is extended forwardly through the side of the housing 87 and is fitted with a crank 98 by means of which the shaft may be rotated. The arrangement of parts is such that when the crank is manipulated each of the shafts, due to their gear interconnection, will be rotated synchronously as will also be the spur gears 97. Affixed to and rising tangentially from the housings 89 are rectangular rack section 101 provided with teeth 102 meshing with those of the spur gears 97 and having extensions 103 at their upper ends provided with notches 104 in which the spit rod 106 is supported. A bracket 107 extending from one of the rack extensions 103 carries an electric motor 108 and its gear reduction unit, mentioned above, which is connected to the spit, for rotating the latter, through a suitable coupling 109. Since the rack sections 101 are geared to the shafts 92 and 93 it will be seen that rotation of the latter by the crank 98 will effect a raising or lowering of the spit 106, as desired toward or from the fire pit 86. As in the arrangement shown in Figures 1 to 6, the form of the invention just described encloses the gears, shafts and bearings within housings wherein they will be shielded against direct contact with flame or hot gases issuing from the pit or firepot and will further protect them against ashes which might collect thereon and foul them.

We claim:

1. Barbecue apparatus comprising a carriage having rectangular top and bottom tubular frames joined at their respective corners by vertical tubular legs, opposed vertical guides carried by the side members of the bottom frame, a spit carried by the upper frame, rack sections slidable in said guides, a firepot within said frames and attached to said rack sections to be moved therewith toward or from said spit, a shaft concentric with and journaled in the tubular end member of said upper frame, said shaft extending exteriorly of said frame and provided with a crank whereby said shaft may be manually rotated, shafts concentric with and journaled in said bottom frame and vertical tubular legs, miter gears mounted on and operatively connecting the respective shafts whereby each shaft will be correspondingly rotated by manipulation of said crank, and spur gears carried by the shafts mounted in said bottom tubular frame and meshing with said rack sections.

2. Barbecue apparatus comprising a carriage having top and bottom frames joined together by leg members, opposed guide members carried by the side members of the bottom frame, members slidable in said guide members, a firepot within said frames and attached to said slidable members, a rotatable spit mounted on the upper frame, an oven adjacent one side of said firepot and within said frames, said oven having one side wall adjacent the firepot through which heat from said firepot may be transmitted, and means operatively connected to said slidable members to raise and lower said firepot to simultaneously vary the amount of heat transmitted to said spit and said oven.

3. Barbecue apparatus comprising a carriage having top and bottom frames joined together by leg members, opposed guide members carried by the side members of the bottom frame, members slidable in said guide members, a firepot within said frames and mounted on said slidable members, a rotatable spit mounted on the upper frame, an oven adjacent one side of said firepot and within said frames, said oven having one side wall adjacent the firepot through which heat from said firepot may be transmitted, and manual crank means operatively connected to said slidable members to raise and lower said firepot to simultaneously vary the amount of heat transmitted to said spit and said oven, said firepot being readily detachable from said slidable members for removal thereof from its normal position within said frame.

LEONARD E. BOYD.
ALICE I. BOYD.

REFERENCES CITED

The following references are of record in the file of this patent:

UNITED STATES PATENTS

| Number | Name | Date |
| --- | --- | --- |
| 956,064 | Fish | Apr. 26, 1910 |
| 1,442,584 | Schey | Jan. 16, 1923 |
| 1,540,434 | Stone | June 2, 1925 |
| 1,853,319 | Polhemus | Apr. 12, 1932 |
| 2,114,697 | Babin | Apr. 19, 1938 |
| 2,122,780 | Peyton | July 5, 1938 |
| 2,154,165 | Huntington | Apr. 11, 1939 |
| 2,213,483 | Benson | Sept. 3, 1940 |
| 2,307,914 | Bitney | Jan. 12, 1943 |
| 2,334,847 | Spiers | Nov. 23, 1943 |
| 2,379,239 | Krebs | Jan. 26, 1945 |
| D. 141,910 | Ward | July 31, 1945 |
| 2,386,815 | Rubenstein | Oct. 16, 1945 |